Jan. 8, 1935.  W. H. FOSTER  1,987,006

SPEED CONTROL MEANS

Filed Dec. 3, 1931  5 Sheets-Sheet 1

Inventor
William H. Foster.

By Wilkinson, Huxley, Byron & Knight
Attys

Jan. 8, 1935.　　　　　W. H. FOSTER　　　　1,987,006
SPEED CONTROL MEANS
Filed Dec. 3, 1931　　　　5 Sheets-Sheet 3
Fig. 3
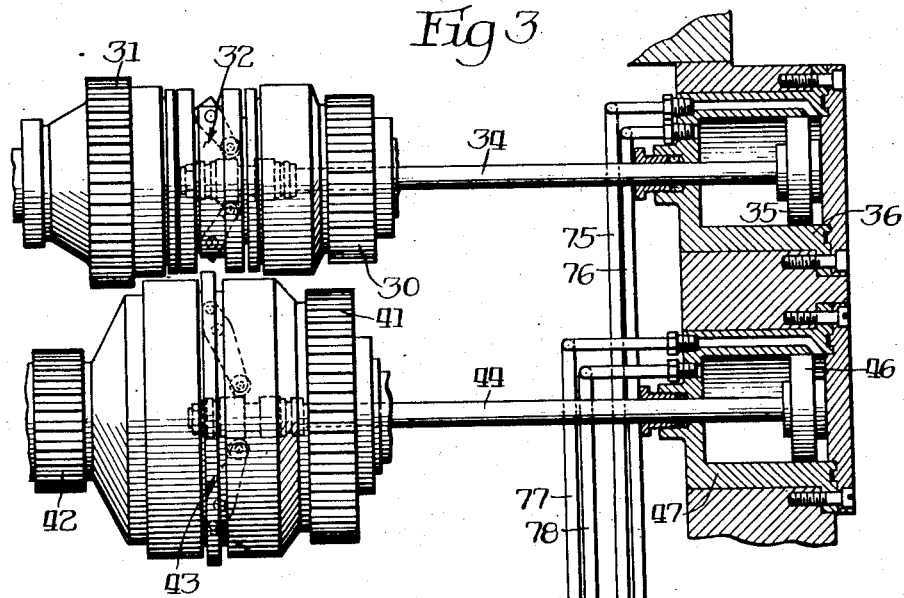
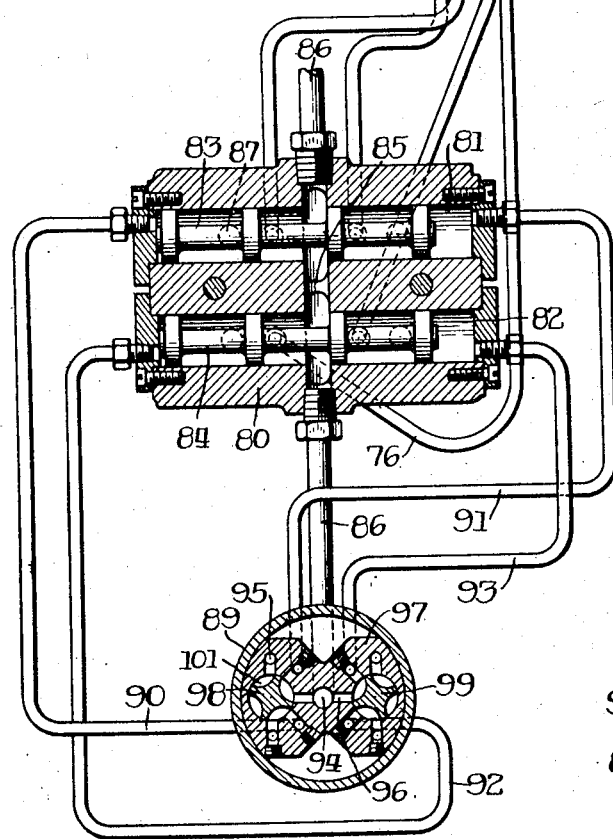
Fig. 8
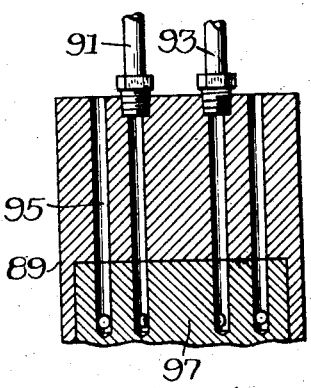
Inventor:
William H. Foster
By Wilkinson, Huxley, Byron & Knight
Attys Jan. 8, 1935.  W. H. FOSTER  1,987,006
SPEED CONTROL MEANS
Filed Dec. 3, 1931  5 Sheets-Sheet 4
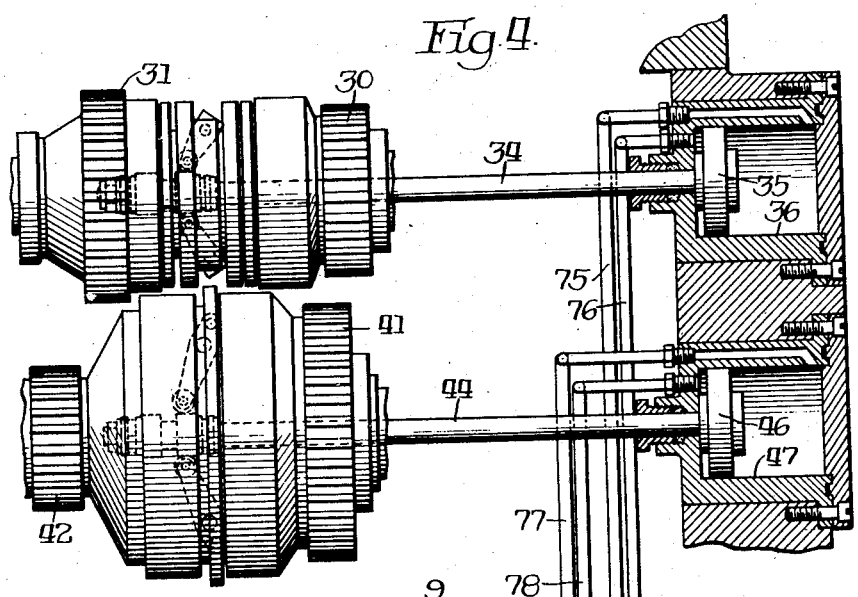
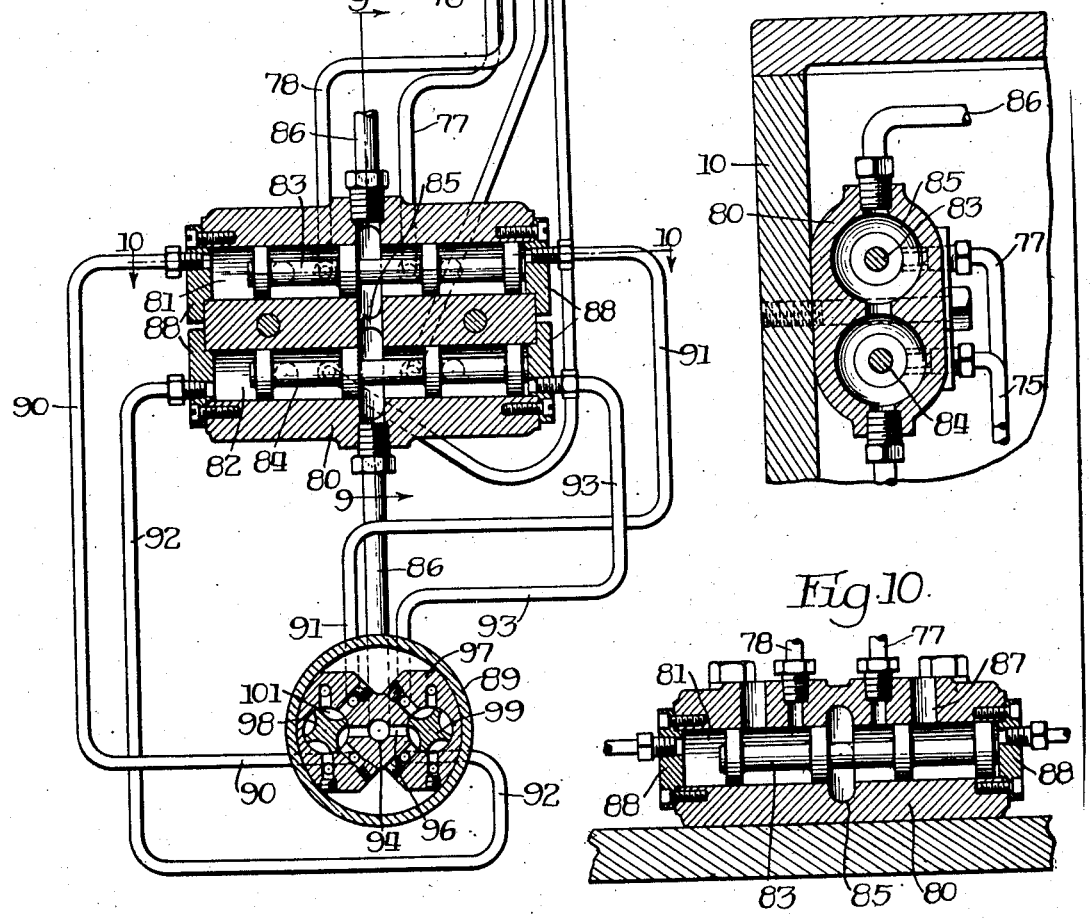
Inventor:
William H. Foster
By Wilkinson, Huxley, Byron & Knight
Attys.

Jan. 8, 1935.  W. H. FOSTER  1,987,006
SPEED CONTROL MEANS
Filed Dec. 3, 1931  5 Sheets-Sheet 5
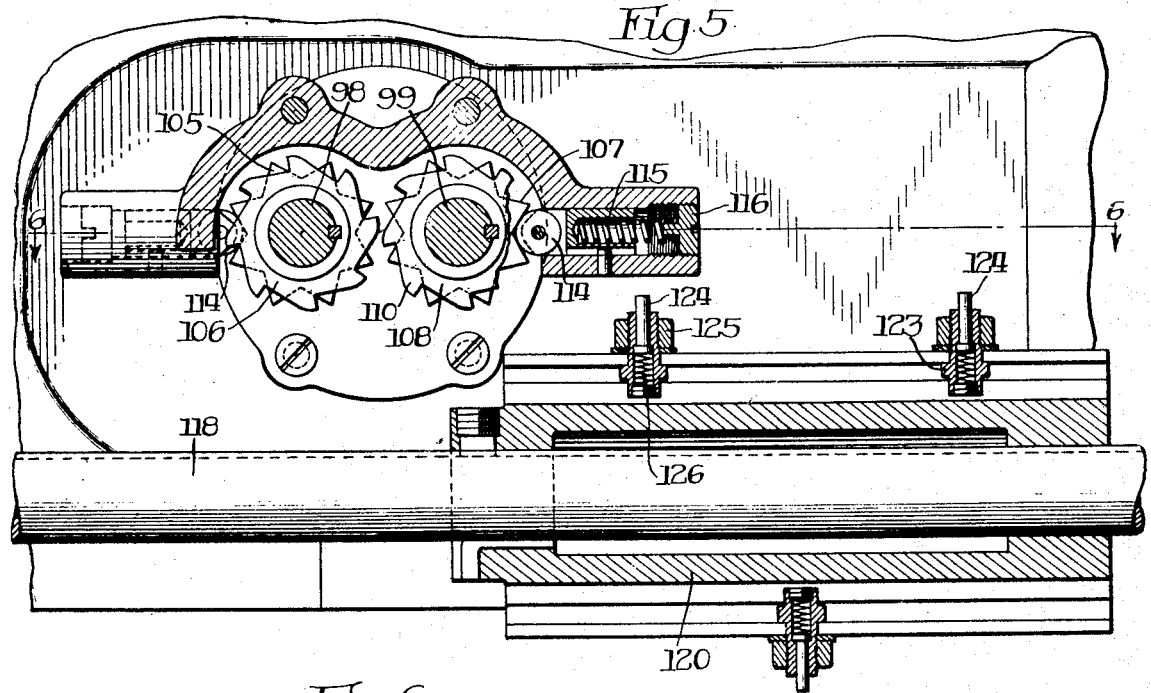
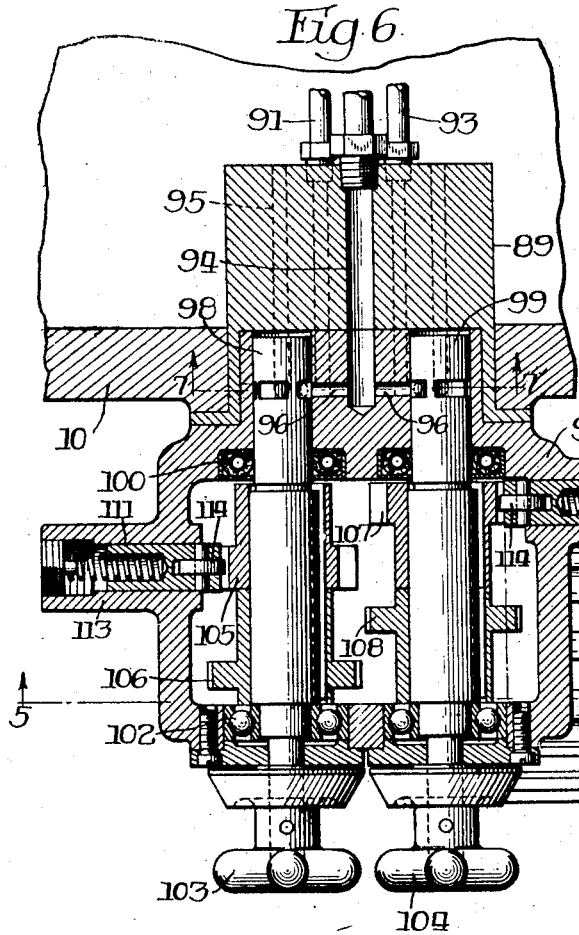
Inventor:
William H. Foster
By Wilkinson, Huxley, Byron & Knight
Attys.

Patented Jan. 8, 1935

1,987,006

UNITED STATES PATENT OFFICE 1,987,006

SPEED CONTROL MEANS

William H. Foster, Elkhart, Ind.

Application December 3, 1931, Serial No. 578,643

17 Claims. (Cl. 29—64)

The invention relates to speed controlling mechanism and has reference particularly to speed control means for turret lathes whereby for any indexed position of the turret a particular speed of the work holding member can be automatically secured through the reciprocating movement of the turret toward the work holding member.

The present invention comprises an improvement over the speed control means disclosed in the copending application of William H. Foster, Serial No. 476,506 filed August 20, 1930, and accordingly has for an object to provide speed control means adapted to turret lathe practice for automatically selecting a predetermined speed of rotation of the chuck of a turret lathe or the like for each operation of the turret thereof and for changing said speed during any of the operations of the turret according to a predetermined sequence.

Another object is to provide driving mechanism for turret lathes with speed control means whereby changes in speed of the driving mechanism can be accomplished automatically as desired in an efficient manner by pressure means actuating friction clutches.

Another object, as exemplified in the present disclosure, is to provide a construction for automatically changing the speed of a work holding member according to a predetermined sequence of operations and which will embody a minimum number of parts, compactly assembled and operated without the necessity of using skilled labor.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 3 is a diagrammatic view of certain parts of the structure shown in Figure 1 showing the association therewith of the operating means comprising the present invention;

Figure 4 is a diagrammatic view of the parts shown in Figure 3 and the operating means therefor, the mechanism being illustrated in their other position of operation;

Figure 5 is a vertical sectional view taken on the line 5—5 of Figure 6 and showing the means for actuating the rotating valves;

Figure 6 is a plan section of the apparatus shown in Figure 5, the same being taken on the line 6—6 of Figure 5;

Figure 7 is a detail sectional view taken on the line 7—7 of Figure 6 and showing the rotating valves and their connections;

Figure 8 is a detail sectional view taken on either of the planes indicated by lines 8—8 of Figure 7;

Figure 9 is a sectional view taken on the line 9—9 of Figure 4 and showing the connections for supplying one of the valve casings with fluid under pressure;

Figure 10 is a section taken on the line 10—10 of Figure 4 and illustrating in detail the chambers receiving the reciprocating valves and the connections for the chambers, and Figure 11 is an elevational view of a turret lathe showing the construction of the invention applied thereto.

Figure 1:
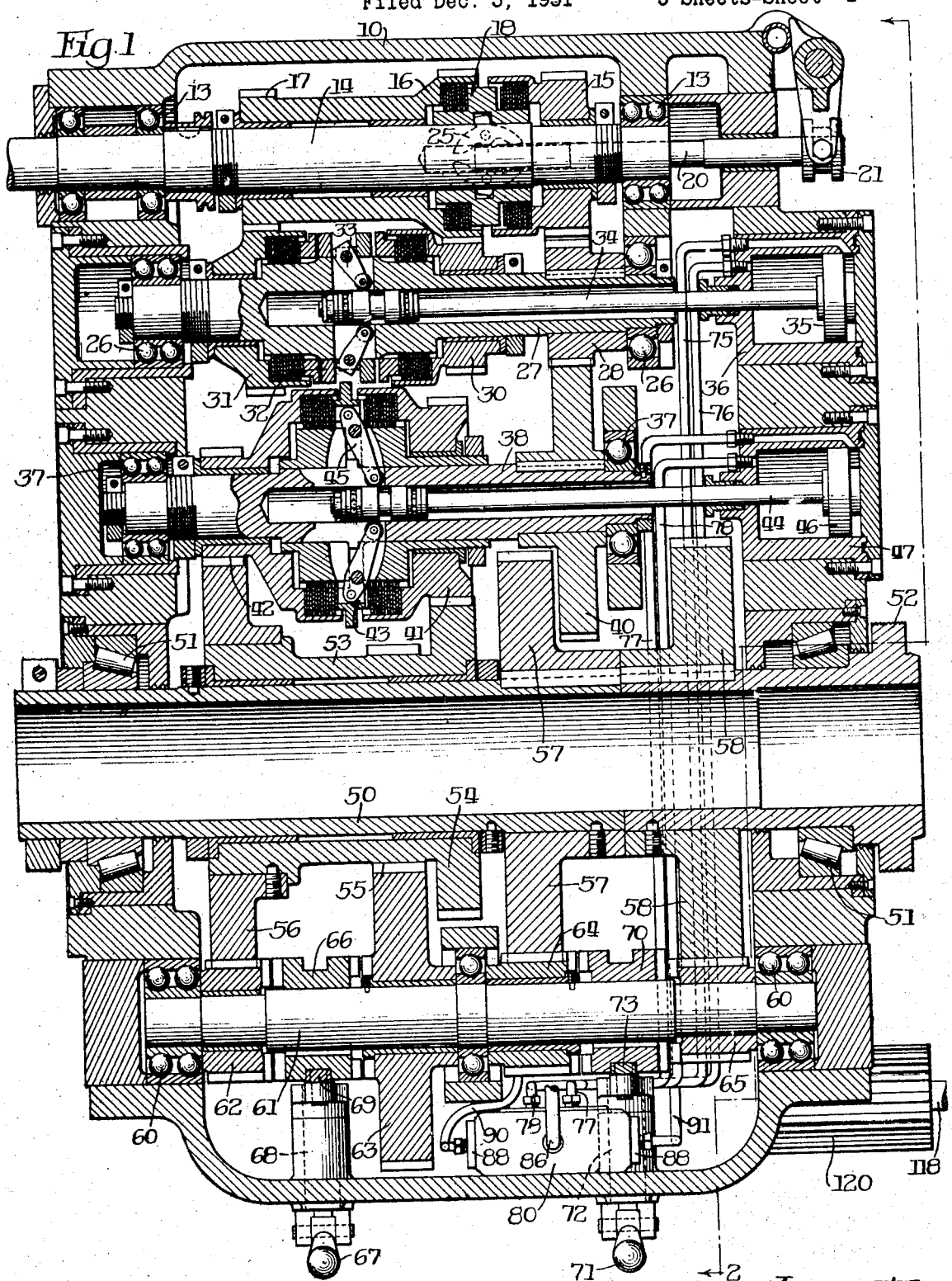
Figure 1 is a plan section showing a form of speed changing mechanism which may be used in the practice of the present invention, the section being taken along the plane indicated by line 1—1 of Figure 2.
Figure 2:
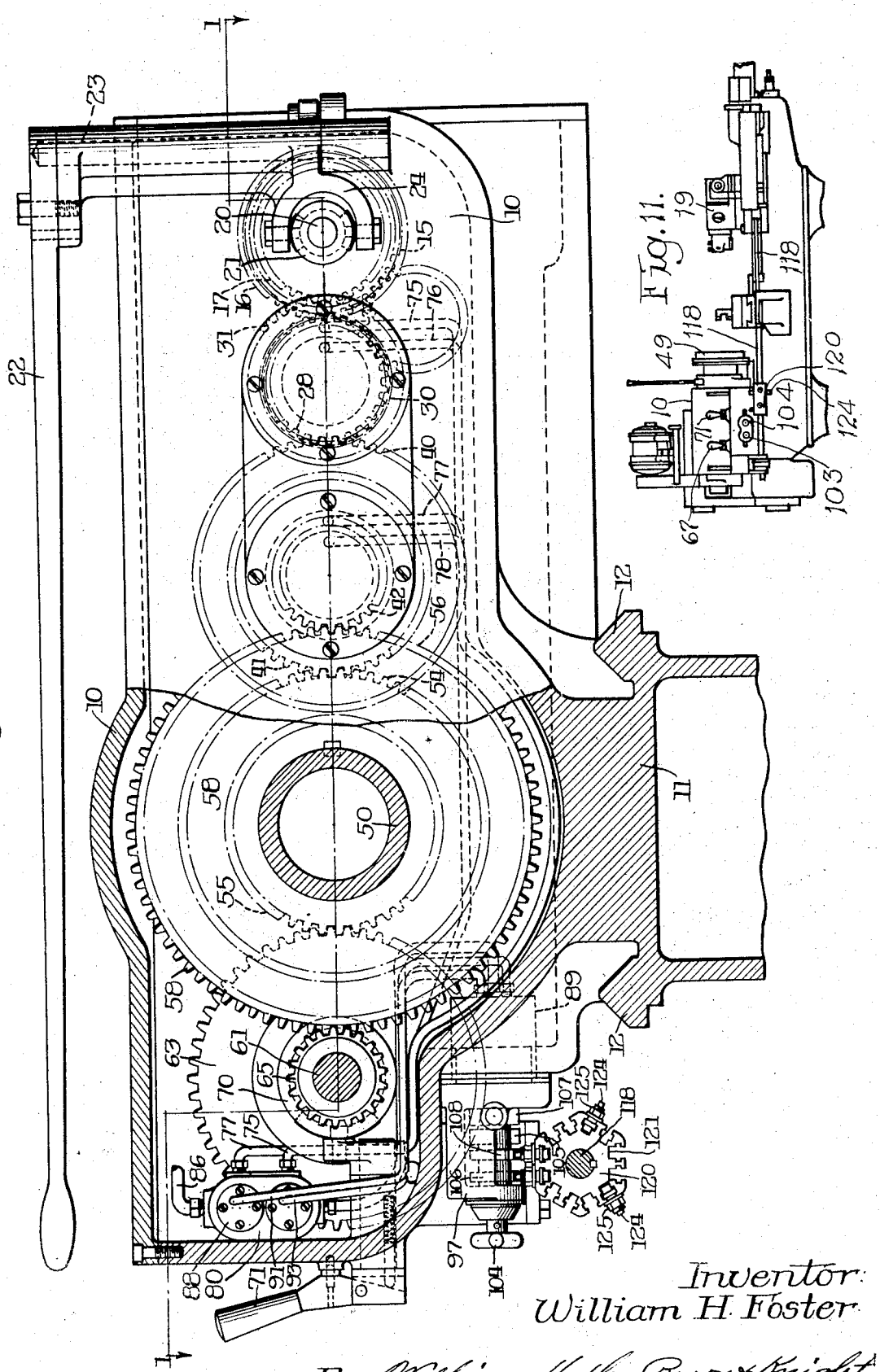
Figure 2 is a front elevational view, parts being shown in section, of the head stock of a lathe and which houses a spindle carrying the work holder and operating means for the speed changing mechanism shown in Figure 1.

Referring to Figures 1 and 2 there is shown a housing 10 for the speed changing mechanism mounted upon the frame 11 of a turret lathe or the like, provided with ways 12 for reciprocation of a turret slide adapted to carry the usual form of turret 19, Figure 11. The housing 10 carries bearings 13 for rotatably supporting the shaft 14 on which is rotatably mounted the pinion 15 and a sleeve providing pinions 16 and 17. Positioned between pinions 15 and 16 is a set of friction clutches 18 operated by means of rod 20 extending axially of the shaft 14 and projecting outwardly of the housing to receive a collar 21. By means of an operating shaft 22, secured at one end to shaft 23 rotatably mounted on the housing and carrying a yoke 24 engaging collar 21, the operating rod 20 is reciprocated to rock the pivoted arms 25 having operative association with the friction clutches 18.

Rotatably mounted in bearings 26 adjacent shaft 14 is a shaft 27 having keyed thereto a pinion 28 and having rotatably mounted thereon pinions 30 and 31 meshing respectively with pinions 16 and 17. Positioned on the shaft between the latter pinions is a set of friction clutches indicated in their entirety by 32 and operatively associated by means of the pivoted arms 33 with an operating rod 34 extending axially of the shaft 27 and having secured to its right hand end a piston 35 operating in cylinder 36 suitably mounted in the housing 10.

Rotatably mounted in the housing on bearings 37 adjacent the shaft 27 is a shaft 38 having suitably keyed thereto the gear wheel 40 meshing with pinion 28 and rotatably mounted thereon pinions 41 and 42 separated by a pair of friction clutches indicated generally by 43. Extending axially of shaft 38 is an operating rod 44 associated with the friction clutches 43 by means of pivoted arms 45 and having secured to its right hand end a piston 46 operating in cylinder 47 mounted in the housing.

For supporting a work holder such as a chuck 49, Figure 11 the housing rotatably mounts the spindle 50 in bearings 51 provided at the respective ends thereof and has its right hand end threaded as at 52 for receiving the chuck for holding the work, as is well understood in lathe practice. A sleeve 53 is rotatably mounted on the spindle at its left hand end and provides a gear 54 meshing with pinion 41, a pinion 55 and a second gear 56 adapted to mesh with pinion 42. Suitably keyed to the spindle is a pair of gears 57 and 58 of slightly different diameter. Also journaled in the housing 10 by means of bearings 60 is a shaft 61 having rotatably mounted thereon pinion 62 meshing with gear 56, a gear 63 meshing with pinion 55 and pinions 64 and 65 meshing with the gears 57 and 58, respectively, previously described as keyed to spindle 50.

Non-rotatably secured to shaft 61, but slidable thereon at its left hand end and positioned between the pinion 62 and gear 63, is a clutch element 66 provided with lugs adapted to engage coacting lugs formed on the pinion and gear respectively. By means of handle 67 pivotally secured to shaft 68 and adapted to rotate arm 69, riding in a groove formed in the clutch element 66, the latter can be reciprocated on the shaft 61 to engage with either the lugs formed on the pinion or the gear as described. By the particular location of the clutch element the pinion or the gear is operatively connected to shaft 61 to drive the shaft at a particular speed and the spindle through mechanism to be now described.

Non-rotatably secured to the right hand end of shaft 61 but slidable thereon is a second clutch element 70 provided on its respective faces with lugs adapted to engage coacting lugs formed on pinions 64 and 65, respectively. The clutch element is reciprocated on the shaft to engage either the pinions by means of a handle 71 pivotally secured to shaft 72 whereby the arm 73, riding in a groove formed in the clutch element, is rotated. The rotations of shaft 61 are imparted to the clutch element 70, non-rotatably secured thereto, and through this element to either pinion 64 or 65, depending on the position of the element, as described, and from the particular pinion in operation to the spindle through either gears 57 or 58.

The above structure provides a form of speed changing mechanism which, by actuation of a plurality of clutches, can be caused to drive a work holding spindle at a plurality of speeds for a given speed of the driving shaft 14. The friction clutches 18 are operated through operating rod 20 by means of handle 22 to operatively connect pinion 15 or the pinions 16 and 17 to the driving shaft, which latter have meshing engagement with the pinions 30 and 31 separated by clutches 32, in turn operated by rod 34 hydraulically by means of the piston 35 and cylinder 36 through means to be presently described. The pinion 28 is thus driven at a definite speed, depending on the position of the friction clutches, and in turn drives shaft 38 through gear 40, which is operatively connected to the friction clutches 43 with either pinions 41 or 42. A hydraulic operating cylinder is provided for shaft 44 to cause actuation of the same and the clutches 43. The speed of rotation of sleeve 53 is dependent on the particular pinion 41 or 42 operatively connected to shaft 38 which determines whether gear 54 or gear 56 is driven. The speed of rotation of shaft 61 is dependent on the particular pinion 62 or gear 63 operatively connected to shaft 61 depending on the position of the slidable clutch element 66 operated through handle 67. A further selection of speed is provided by the slidable clutch element 70 operated through handle 71 to finally operatively connect and drive the spindle 50 from shaft 61.

As more particularly shown in Figures 3 and 4 the operating cylinder 36 has connected to its respective ends conduits 75 and 76, while the operating cylinder 47 is in a like manner associated with conduits 77 and 78, the conduits functioning in each case to admit to the cylinder a pressure fluid which when admitted to the right hand end will cause the piston operating in the cylinder to travel to the left and when exhausted from this end and admitted to the left hand end will cause the piston to travel to the right. The conduits from the operating cylinders have suitable connection to a valve housing 80 provided with bores 81 and 82 extending therethrough, receiving respectively, reciprocating valves in the form of pistons 83 and 84. Connected to a central opening 85 formed in the valve housing and joining the bore 81 with bore 82 is a pipe 86 which functions to supply a fluid such as oil under fairly high pressure. The conduits 77 and 78 from cylinder 47 have connection with bore 81 in the valve housing 80 on the respective sides of the central opening 85, Figure 10, while conduits 75 and 76 from cylinder 36 have connection with bore 82, being located on the respective sides of the central opening 85. The valve housing is suitably provided with a plurality of ducts 87, a duct being located adjacent each of the conduits above mentioned and communicating with both bores 81 and 82.

From the above description of the valve housing it will be seen that the particular position of a reciprocating valve, either piston 83 or 84 determines the particular conduit supplied with the pressure fluid, which correspondingly determines whether the pistons 35 and 46 are urged to the right or to the left. With the reciprocating valve 83 in its left hand position, Figure 3, it will be seen that the conduit 78 is supplied with the fluid pressure, while simultaneously therewith conduit 77 is connected with its adjacent discharge duct 87 so as to permit exhausting of the right hand end of cylinder 47, while the left hand end is supplied with the pressure fluid. Similar operation occurs with operating cylinder 36 when the reciprocating valve 84 is in the position shown in Figure 3.

Referring to Figure 4, it will be seen that the reciprocating valves have been located in their right hand position to thereby connect conduits 75 and 77 with the pressure supply, while conduits 76 and 78 are connected with their adjacent exhaust duct. The operating rods 34 and 44 are thus hydraulically actuated to in turn actuate their respective friction clutches by imparting reciprocating movements to the valves 83 and 84.

The valve housing 80 is provided with head members 88 adapted to form closure means closing the bores 81 and 82 and have suitably connected thereto conduits operatively connecting the valve housing 89. The bore 81 has connection at its respective ends with conduits 90 and 91, while bore 82 in a similar manner has connection with conduits 92 and 93, the other ends of the various conduits being connected to the second valve housing. Bores 95 are provided in the housing 89, certain of which connect with the conduits described, while the other bores open to the oil reservoir and thus form discharge ports for purposes which will be presently understood.

Extending from housing 80 is the main supply pipe 86 which admits to a central bore 94 formed in the valve housing a fluid under pressure, the fluid being delivered to the connecting passageways 96. As shown in Figure 6, the valve housing is suitably positioned in the housing 10 and is provided with an opening for receiving the cooperating end of casing 97, the same providing a continuation of bore 94 and the passageways 96 described and also journaling rotating valves 98 and 99 provided with oil retaining bushings 100 for preventing the leakage of oil within the casing. Provided on the periphery of the rotating valves 98 and 99 are a plurality of spaced arcuate grooves 101 and located so as to align with passageways 96 and the terminals of the bores 95, Figure 8.

The above forms a rotating valve structure providing a pair of valves corresponding to the pair of reciprocating valves 83 and 84 and which function to operate the reciprocating valves, rotating valve 98 being associated with conduits 90 and 91 connecting with bore 81, while rotating valve 99 is associated with conduits 92 and 93, connecting with bore 82. Depending on the particular position of the rotating valve the piston members 83 and 84 are caused to travel to the right or left. As shown in Figure 3, valve 98 is positioned to admit the pressure fluid to conduit 91 and to exhaust valve 90 to thereby force the reciprocating valve 83 to the left, while valve 84 has also been forced in the same direction by similar positioning of the rotating valve 99. The other operative position of the parts is shown in Figure 4 where the rotating valves exhaust, respectively, conduits 91 and 93 and supply the fluid pressure to conduits 90 and 92. Further rotation of the rotating valves will function to cause like rotation of the reciprocating valves alternately to the left and right as described.

The present invention provides automatic means for rotating the valves 98 and 99 for any indexed position of the turret and accordingly the shafts of the valves extend through casing 97 and through bearings 102 to project outwardly of the casing for receiving handles 103 and 104. Non-rotatably secured to each shaft within casing 97 is a sleeve providing a ratchet plate 105 and a cam plate 106 for valve 98, Figure 5, and a ratchet plate 107 and cam plate 108 for valve 99. The cam plates are provided with lugs 110 having a shoulder which presents, when the lug is in its lowermost position, a vertical face directed toward upstanding pins positioned to the right of the cam plates, Figure 5, and which will be presently described. In order to maintain the rotating valves in adjusted position detent members 111 and 112 are slidably mounted in receptacles 113 formed on casing 97, the members being provided at their inner ends with wheels 114 engaging notches in the ratchet plates 105 and 107, respectively. Coil springs 115 are located within the detent members and since the springs are held in position by threaded screws 116 they function to resiliently urge the wheels into engagement with their corresponding plates.

As shown in Figures 5 and 6 the numeral 118 indicates a rod carried by and reciprocable with the turret slide, riding upon the ways 12—12, the rod, in accordance with practice well known in lathe construction, being rotated through part of the circumference of a circle with each indexing or turning movement of the turret 19 carried by the turret slide and being reciprocated longitudinally with the travel of the turret. Suitably positioned on the rod is a frame member 120 having a number of faces to correspond with the various indexed positions of the turret and being provided with grooves 121, Figure 2, for adjustably receiving the threaded receptacles 123 carrying resiliently mounted pins 124, the receptacles being adjustably positioned in the grooves by nuts 125, Figure 5. A pair of grooves are provided in each face of the member 120 and positioned so as to present a pair of pins 124 in alignment with the cam plates 106 and 108. It will thus be seen that by longitudinal movement of rod 118 the pins 124 will be caused to engage the cams on the cam plates to rotate the valves in one position such as shown in Figures 3 and 4. The actuation of the valves will, as has been described, cause corresponding reciprocation of the valves 83 and 84 to actuate the operating rods and their corresponding friction clutches. The pins are purposely provided with coil springs 126 so that they are resiliently urged outwardly to engage the cams during movement to the left, Figure 5, and to ride over the cams in their movement to the right so that this latter movement of rod 118 does not effect the setting of the rotating valves.

For a particular grinding, boring or facing operation to be performed by the turret lathe the turret is provided with a tool for the purpose and by the structure of the present invention the spindle 50 can be automatically caused to assume a certain speed of rotation by a setting of the pins 124 in their member 120. A face is provided on the member for each tool carried by the turret so that as different tools require different speeds of the spindle the various faces can present a pin or a plurality of pins to automatically rotate the valves 98 and 99 during the travel of the turret toward the work to cause the same to assume the desired speed. Since the pins are adjustable they can be positioned on member 120 as desired and the mechanism is not limited to automatic operation of the speed changing mechanism only in advance of an operation upon the work but can also accomplish a change in the speed of the spindle during a facing, boring or similar operation.

The present construction provides a structure in which the turret may perform successive operations upon a work piece with the initial speeds of the spindle being determined by the positioning of the adjustable pins, with the indexing of the turret automatically presenting other adjustable pins by which actuation of the clutches is caused to secure a desired change in speed. In addition to the above the operator has control of the handles 67 and 71 and through actuation other speeds of the spindle may be manually secured. An important feature resulting from the present invention, and particularly from the type of clutch structure and operating means employed, is the operation of automatic speed control mechanism during a cutting operation to either increase the speed of the spindle or decrease the same, the cutting tool remaining in contact with the work at all times. The change of speed is accomplished by the particular setting of the adjustable pins and by the arrangement of the clutch and hydraulic operation the speed of the work can be increased or decreased without loss of power and in such an efficient manner as to prevent any breaking of the tools or imperfect cutting of the work.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a turret lathe, in combination, a driving member, a work holding device, gears connecting said driving member to said device, a plurality of clutches for selectively connecting certain gears to produce changes of speed in said device for a given speed of the driving member, pressure responsive means for operating said clutches, and means having rotative and longitudinal movements in response to like movements of the turret for controlling the pressure responsive means.

2. In a turret lathe, in combination, a driving member, a work holding device, gears connecting said driving member to said device, a plurality of clutches for selectively connecting certain gears to produce changes of speed in said device for a given speed of the driving member, pressure responsive means for operating said clutches, valve means for controlling the operation of said pressure responsive means, and a member having longitudinal and rotative movements in response to like movements of the turret for actuating the valve means.

3. In a turret lathe, in combination, a driving member, a work holding device, gears connecting said driving member to said device, a plurality of clutches for selectively connecting certain gears to produce changes of speed in said device for a given speed of the driving member, pressure responsive means for operating said clutches, reciprocating valve members for controlling the operation of said pressure responsive means, rotating valve means the rotative positions of which determine the operative positions of the reciprocating valve members, and a member having longitudinal and rotative movements in response to like movements of the turret for actuating the valve means.

4. In a turret lathe, in combination, a spindle, drive mechanism for the spindle, a plurality of clutches for controlling the speed ratio of the drive mechanism, a pressure responsive member cooperatively associated with each of said clutches, means having longitudinal and rotative movements in response to similar movements of the turret, and pressure supply means actuated by the longitudinal and rotative means for controlling the pressure in said pressure responsive members.

5. In a turret lathe, in combination, a spindle, drive mechanism for the spindle, a plurality of clutches for controlling the speed ratio of the drive mechanism, a pressure responsive member cooperatively associated with each of said clutches, a rod having longitudinal and rotative movements in response to similar movements of the turret, and means adjustably positioned on the rod for controlling the pressure responsive members.

6. In a turret lathe, in combination, a spindle, drive mechanism for the spindle, a plurality of clutches for controlling the speed ratio of the drive mechanism, a pressure responsive member cooperatively associated with each of said clutches, valve means for controlling the flow of a pressure fluid to and from said pressure responsive members, a rod having longitudinal and rotative movements in response to similar movements of the turret, and members adjustably positioned on the rod and adapted to engage said valve means during longitudinal movement of the same to thereby actuate the clutches.

7. In a turret lathe, in combination, a spindle, drive mechanism for the spindle, a plurality of clutches for controlling the speed ratio of the drive mechanism, a pressure responsive member cooperatively associated with each of said clutches, rotating valve means for controlling the flow of a pressure fluid to and from said pressure responsive members, a rod having longitudinal and rotative movements in response to similar movements of the turret, members adjustably positioned on the rod and adapted to engage said valve means during longitudinal movement of the same to partially rotate the valves, and means for maintaining the valves in their respective rotated positions.

8. In a turret lathe, in combination, a driving member, a spindle having a work holding device, gears operatively connecting said driving member and said spindle, a plurality of clutches for selectively connecting certain gears to produce changes in the speed of said spindle for a given speed of the member, pressure responsive means for imparting operation to said clutches, said means having connection with a source of pressure fluid, control means for the fluid interposed between the source and the pressure responsive means for controlling the supply of fluid thereto, and means having longitudinal movements responsive to similar movements of the turret for actuating the control means.

9. In a turret lathe, in combination, a driving member, a spindle having a work holding device, gears operatively connecting said driving member and said spindle, a plurality of clutches for selectively connecting certain gears to produce changes in the speed of said spindle for a given speed of the member, pressure responsive means for imparting operation to said clutches, said means having connection with a source of pressure fluid, control means for the fluid interposed between the source and the pressure responsive means for controlling the supply of fluid thereto, and means having longitudinal movements responsive to similar movements of the turret for actuating the control means, said means also being rotatable in response to similar movements of the turret for varying the actuation of the control means.

10. In a turret lathe, in combination, a driving member, a spindle having a work holding device, gears operatively connecting said driving member and said spindle, a plurality of clutches for selectively connecting certain gears to produce changes in the speed of said spindle for a given speed of the member, pressure responsive means for actuating the clutches, said means having connection with a source of pressure fluid, control means for the fluid interposed between the source and the pressure responsive means for controlling the supply of fluid thereto, and means responsive to the longitudinal and rotative movements of the turret for hydraulically actuating the control means.

11. In a turret lathe, in combination, a driving member, a spindle having a work holding device, gears operatively connecting said driving member and said spindle, a plurality of clutches for selectively connecting certain gears to produce changes in the speed of said spindle for a given speed of the member, an operating cylinder associated with said clutches, a conduit leading from the respective ends of said cylinder, a source of fluid pressure supply, control means connecting with the conduits and with said source of supply whereby the fluid pressure is selectively admitted to one end of the cylinder and exhausted from the other to cause actuation of the clutches, and means hydraulically operating the control means in response to rotative and longitudinal movements of the turret.

12. In a turret lathe, in combination, a driving member, a spindle having a work holding device, gears operatively connecting said driving member and said spindle, a plurality of clutches for selectively connecting certain gears to produce changes in the speed of said spindle for a given speed of the member, an operating cylinder associated with said clutches, a conduit leading from the respective ends of said cylinder, control means connecting with said conduits and a source of fluid pressure to control the admisison of fluid to the conduits, and valve means also connecting with the source of fluid pressure to hydraulically actuate the control means, said valve means being operated in response to the longitudinal movements of the turret.

13. In a turret lathe, in combination, a spindle having work holding means thereon, drive mechanism for the spindle, said drive mechanism including a plurality of gears meshing with each other and with the spindle, clutches associated with certain of the gears for selectively connecting certain gears to control the speed of the spindle, pressure responsive means for actuating said clutches respectively including an operating cylinder therefor, a conduit leading from the respective ends of said cylinder, reciprocating means having connection with the pressure medium and with said conduits, whereby said reciprocating means controls the supply of pressure medium to the conduits, and means having rotative and longitudinal movements in response to similar movements of the turret to control the operation of said reciprocating means.

14. In a turret lathe, in combination, a spindle having work holding means thereon, drive mechanism for the spindle, said drive mechanism including a plurality of gears meshing with each other and with the spindle, clutches associated with certain of the gears for selectively connecting certain gears to control the speed of the spindle, pressure responsive means for actuating said clutches respectively including an operating cylinder therefor, a conduit leading from the respective ends of said cylinder, reciprocating means having connection with a pressure medium and with said conduits, whereby said reciprocating means controls the supply of pressure medium to the conduits and to said operating cylinder, rotating valves operating hydraulically to control the position of said reciprocating means, and means having longitudinal and rotative movements in response to similar movements of the turrets for actuating the rotating valves.

15. In a turret lathe, in combination, a spindle having work holding means thereon, drive mechanism for the spindle including a plurality of gears meshing with each other and with said spindle, clutches associated with certain of the gears for selectively connecting certain gears to control the speed of said spindle, and means for selectively actuating said clutches including an operating cylinder therefor, a conduit connecting with each end of said cylinder, a casing connecting with the other end of said conduits, said casing having connection with a pressure medium and housing reciprocating valves, said valves being operative to close and open ports leading to said conduits to thereby control the supply of pressure medium to said operating cylinder, and means having rotative and longitudinal movements in response to similar movements of the turret for controlling the position of said reciprocating valves.

16. In a turret lathe, the combination of a spindle having a work supporting device, a constant speed driving shaft, gearing connecting the shaft and the spindle and including clutches for changing the speed of the spindle, a hydraulic cylinder and coacting piston having association with the clutches, a source of fluid supply under pressure connecting with the cylinder, control means interposed in said fluid supply including a reciprocating member for controlling the supply of fluid to the cylinder, and a rotative valve also connecting with the fluid supply for hydraulically actuating the reciprocating member, said valve being rotated by longitudinal movements of the turret.

17. In a turret lathe, the combination of a spindle having a work supporting device, a constant speed driving shaft, gearing connecting the shaft and the spindle and including clutches for changing the speed of the spindle, a hydraulic cylinder and coacting piston having association with the clutches, a conduit leading from each end of the cylinder, a source of fluid supply under pressure, a casing connecting with said fluid supply and with the conduits, a reciprocating member in the casing for selectively connecting one conduit with the fluid suppply and the other conduit with a discharge outlet, and a rotative valve connecting with the fluid supply to selectively deliver fluid to the respective ends of said member thereby actuating the member, and adjustable means reciprocated by the turret to cause actuation of the valve.

WILLIAM H. FOSTER.